United States Patent [19]

Basile et al.

[11] 4,244,932
[45] Jan. 13, 1981

[54] STABILIZED FERROMAGNETIC CHROMIUM DIOXIDE AND PROCESS FOR OBTAINING SAME

[75] Inventors: Giampiero Basile, Alessandria; Giancarlo Boero, Asti, both of Italy

[73] Assignee: Montedison S.p.A., Milan, Italy

[21] Appl. No.: 57,817

[22] Filed: Jul. 16, 1979

[30] Foreign Application Priority Data

Jul. 21, 1978 [IT] Italy ............................. 25960 A/78

[51] Int. Cl.$^3$ ............................................. C01G 37/02
[52] U.S. Cl. .................................. 423/274; 252/62.51; 252/62.6; 252/62.62; 252/62.64; 423/607; 427/215; 428/403; 428/539; 428/900
[58] Field of Search .................. 423/607, 274; 252/62.51, 62.56, 62.6, 62.62, 62.64; 427/215, 127, 128; 428/403, 539, 900

[56] References Cited

U.S. PATENT DOCUMENTS

| | | | |
|---|---|---|---|
| 3,687,726 | 8/1972 | Pye | 252/62.51 X |
| 4,169,802 | 10/1979 | Basile et al. | 252/62.51 |

FOREIGN PATENT DOCUMENTS 51-21200  2/1976  Japan ........................................ 252/62.51

*Primary Examiner*—Jack Cooper
*Attorney, Agent, or Firm*—Stevens, Davis, Miller & Mosher

[57] ABSTRACT

A ferromagnetic chromium dioxide stabilized by coating the particles thereof with a stabilizing substance is disclosed, wherein the stabilizing substance consists essentially of an equimolecular mixture of $Fe_2O_3$ and MnO or of a mixture of ferrite $MeFe_2O_4$ with oxides $Fe_2O_3$ and MeO, wherein Me represents Cu, Co, Zn or Mg and wherein the molar ratio $Fe_2O_3$/MeO is equal to 1, the quantity of the ferrite in the mixture being such as results from calcining, at temperature between 250° and 350° C., equimolecular quantities of $Fe_2O_3$ and MeO. A process for obtaining the stabilized $CrO_2$ is also disclosed wherein the $CrO_2$ is dispersed in water and on it are co-precipitated $Fe(OH)_3$ and $Mn(OH)_2$ or $Me(OH)_2$ in stoichiometric quantities with respect to each other; after which the $CrO_2$, in admixture with the hydroxides, is separated from the water, dried at a temperature not exceeding 100° C. and then calcined at temperatures between 250° and 350° C.

6 Claims, No Drawings

STABILIZED FERROMAGNETIC CHROMIUM DIOXIDE AND PROCESS FOR OBTAINING SAME

The present invention relates to a stabilized ferromagnetic chromium dioxide and to a process for obtaining the same.

Chromium dioxide is a material of high magnetic characteristics that finds its main application in the field of magnetic tape recording. Chromium dioxide displays a certain chemical reactivity towards water and certain easily oxidizable functional groups, such as for instance hydroxyl or amine groups. These functional groups are often present in the resins used in the formulations for magnetic tapes, whereupon the $CrO_2$ particles incorporated in the tape may oxidize the functional groups, being themselves reduced, at least on the surface, to chromium compounds having a lower valency, such as CrOOH, which are not ferromagnetic as a result of which the residual magnetization of the tape may drop in the course of time. As a consequence, a tape on which there has been made a recording may present a drop in the output level after a period of time.

It is known to stabilize the $CrO_2$ by subjecting the surface of the particles thereof to a reducing treatment by making it react, for instance, with $H_2S$ or with alkaline bisulphites. Such a treatment, however, has the drawback of consuming via the reduction reaction a considerable quantity (up to about 30%) of the treated $CrO_2$.

It has also been suggested to stabilize the $CrO_2$ by coating the particles thereof with various substances that are insoluble in water, for instance $SiO_2$ or $Al_2O_3$. It was not possible, however, to obtain an appreciable stabilizing effect with such coatings; while the $CrO_2$ particles dispersed in water showed after such a treatment a considerable reduction of their reactivity with water, no appreciable improvement could be detected when the stability of the $CrO_2$ was tested on the tapes themselves.

Thus, one object of this invention is that of providing a chromium dioxide that will show a high chemical stability towards water and oxidizable organic substances, thus displaying a high chemical stability in the magnetic tapes in which it is used.

Another object of this invention is that of achieving this result by means of a simple coating, thus avoiding the consumption of a part of the $CrO_2$ during the stabilizing treatment.

Still another object of the invention is that of providing a process for obtaining such a stabilized $CrO_2$.

All these and other useful objects are achieved by providing a ferromagnetic chromium dioxide stabilized by coating the particles thereof with a stabilizing substance which, according to this invention, consists or consists essentially of an equimolecular mixture of $Fe_2O_3$ and MnO or a mixture of ferrite $MeFe_2O_4$ with the oxides $Fe_2O_3$ and MeO, wherein Me represents Cu, Co, Zn, or Mg, and wherein the molar ratio $Fe_2O_3$/MeO is equal to 1, the quantity of ferrite in the mixture being equal to that which is formed by calcining equimolecular quantities of $Fe_2O_3$ and MeO at temperatures between 250° and 350° C.

The quantity of the stabilizing coating substance, in general, is between 2% and 12% by weight, referred to the $CrO_2$. Quantities lower than 2% may exert an insufficient stabilizing effect, while quantities greater than 12% do not in general improve the stability of the products. For the purpose of this invention, there are preferably used quantities of coating between 3% and 10% based on the weight of the $CrO_2$.

The mixtures based on Cu or Co ferrites and oxides and those based on Mn oxide in general confer upon the $CrO_2$ a greater stability in comparison with those based on Zn or Mg ferrites and oxides and they are, therefore, preferred. Particularly preferred are the mixtures based on Cu ferrite and oxide.

The $CrO_2$ stabilized with oxides or ferrites and oxides according to this invention may be obtained by means of a three-stage process wherein:

In the first stage, the $CrO_2$ is dispersed in water and on it are co-precipitated $Fe(OH)_3$ and $Mn(OH)_2$ or $Me(OH)_2$, taken in stoichiometric quantities with respect to each other. Thereupon the $CrO_2$ in admixture with the hydroxides is separated from the water. In the second stage, the mixture is dried at a temperature not exceeding about 100° C. In the third stage the dried product is calcined at a temperature which in general is between 250° and 350° C.

In the first stage, the co-precipitation of the hydroxides may be achieved by reacting hydrosoluble salts of the metals, e.g., chlorides or sulphates, with an aqueous solution of an alkaline hydroxide, for instance NaOH, or $NH_3$. The alkali or the ammonia is metered in such quantities as to bring the $CrO_2$ slurry containing the metal salts to pH values that are optimal for the co-precipitation, that is, to values in general between 8 and 10.

In the second stage, that is, during the drying, it is convenient to operate at a temperature not exceeding 100° C., because above this temperature the $CrO_2$ that is still in contact with the water may partially react therewith.

In the third stage, the formation of ferrite by reaction of $Fe_2O_3$ with MeO takes place. This reaction is not complete whereupon the coating consists of a mixture of $MeFe_2O_4$, $Fe_2O_3$ and MeO. The quantity of ferrite that forms is so much the higher the higher the calcining temperature. There is no formation of ferrite in the case of Mn. In any case, one obtains a particularly adherent coating on the $CrO_2$ particles.

Calcining temperatures lower than about 250° C. usually do not insure a good stabilization of the $CrO_2$, while temperatures greater than about 350° C., in general, should be avoided because these may cause partial degradation of the $CrO_2$. Preferably one should operate between 300° and 350° C., while the best results are usually obtained between 330° and 350° C.

The coating thus consists of a calcined product obtained at between 250° and 350° C., but preferably at between 300° and 350° C., from equimolecular quantities of $Fe_2O_3$ and MnO, CuO, CoO, ZnO or MgO.

While the quantity of ferrite formed increases with the increasing calcining temperature, this also depends on the nature of the metal Me. Thus, the coatings formed by calcining at 350° C. contain about 25% by weight of $MeFe_2O_4$ (calculated on the total weight of the coating) in the case of Cu; about 35% in the case of Co; about 60% in the case of Zn; and about 75% in the case of Mg. These quantities are determined on the basis of diffractometric X-ray analysis.

The coating of $CuFe_2O_4$, $Fe_2O_3$ and CuO, formed by calcining at temperatures between 250° and 350° C., has a percentage weight of $CuFe_2O_4$ generally between 11% and about 25%. The preferred coating, obtained by calcining at temperatures between 300° and 350° C., has a content in $CuFe_2O_4$ generally between about 18% and about 25%.

Any type of ferromagnetic chromium dioxide may be used as starting $CrO_2$. There may be used a $CrO_2$ free of modifiers as well as a $CrO_2$ modified with any modifying element of $CrO_2$ such as for instance: Sb, Te, Fe, La and Ru or any combination of modifying elements such as for instance: Sb+Fe, Sb+Te, Te+Fe, La+Fe, Sb+Te+Fe, etc., etc.

The chromium dioxide modified with a modifying element, or with a combination of modifying elements, is described in numerous patents such as for instance in the following U.S. Pat. Nos. 2,885,365; 2,923,683; 2,923,684; 3,034,988; 3,068,176; 3,371,043; 3,640,871; 3,687,851; and 3,874,923.

The greatest benefit is obviously obtained when the starting $CrO_2$ has characteristics that make it well suited for use in magnetic tapes; that is, a coercive force $H_c$ of at least 450 Oersted and a residual magnetization of at least 1500 Gauss, a mean particle length of not more than 0.5 microns, and an axial ratio (length/width ratio) of the particles of around 10.

The best stability, in general, is attained when the starting $CrO_2$ particles are suitably disaggregated so as to bring the mean size of the agglomerates to under 150 microns, and preferably under 50 microns. Best results are obtained in general when bringing this mean size down to below 10 microns.

The disaggregation of the particles may be carried out by either dry or wet grinding. Particularly convenient is wet grinding, for instance in a rotating jar containing a suitable grinding material, for instance steatite balls, or in a micro-ball mill with micro-balls made for instance of steel or ceramic material, or again in a vessel containing glass microspheres, subjected to shaking.

Wet grinding is usually carried out in water with a concentration in $CrO_2$ generally between 150 and 350 g per liter of slurry, but preferably between 250 and 300 g/lt.

The first stage of the treatment is usually conducted at temperatures between 20° and 100° C., but preferably between about 60° and 90° C.

The concentration of $CrO_2$ is usually between 50 and 100 grams per liter of slurry. It is advisable to operate under vigorous stirring in order to ensure a uniform distribution of the reactants and of the reaction products in the chromium dioxide mass.

The iron salt used for the purpose may be either ferric or ferrous. In this latter case, one first precipitates Fe(OH)$_2$ which is then oxidized to Fe(OH)$_3$ with an oxidizing agent. It is convenient to carry out the oxidation by bubbling a stream of air or oxygen through the reaction medium. The bubbling offers the advantage of providing an excellent mixing of the slurry and, thus, may also be used when starting from a ferric salt.

The iron salt and the salt of Mn or Me may be added separately on contemporaneously. When wet grinding the $CrO_2$, either one or both of the salts may be additioned to the $CrO_2$ slurry before the grinding itself.

The alkali or ammonia solution, on the contrary, is added as the last reactant. This addition may be carried out, for instance, in a period of time between 10 and 60 minutes, but preferably in about 30 minutes, until the desired pH value is reached.

Once the desired pH value has been attained, it is convenient to continue the stirring for a further period of time, e.g. for two hours, while keeping the temperature unaltered.

The slurry obtained at the end of the first stage is separated from the water, for instance by filtering, and is then washed in water to remove the soluble salts that were produced during the co-precipitation reaction.

The drying of the cake is carried out at temperatures not exceeding about 100° C. as already previously explained, for instance at temperatures between 60° and 90° C.

It is advisable to apply certain expedients for shortening the drying time; for this purpose the cake may be heated, for instance, under vacuum, or it may be imbibed with acetone before being heated. These two expedients may be used together.

The dried cake is then dry-ground, for instance in an impact stud mill with counter-rotating stud discs, and is then calcined at the temperatures indicated previously. The calcining is carried out, in general, for a period of at least 3 (three) hours, but preferably for a period of time between 5 hours and 10 hours.

The operation may be carried out either in a static oven or in a rotary furnace.

Since the co-precipitation yield amounts to 100%, the quantity of coating formed will coincide with the quantity of $Fe_2O_3$ and bivalent metal oxide introduced into the first stage.

From the diffractometric X-ray examination, it is shown that the coating of the $CrO_2$ consists of oxides (in the case of Mn) or ferrite mixed with $Fe_2O_3$ and MeO (in the case of Cu, Co, Zn and Mg).

The products according to this invention show a considerable stability with respect to water and to oxidizable organic substances and, thus, show a considerable stability in the magnetic tapes.

The stability of these products has been determined on a tape under particularly severe conditions according to a method per se known, which consists in exposing for a number of days a magnetic tape made with $CrO_2$ in a hot environment at a high relative humidity and in measuring the decay of the residual magnetization and of the saturation magnetization of the tape caused by such an exposure. Such a decay is substantially proportional to the decaying of the $CrO_2$.

The following examples are given in order still better to illustrate the inventive ideas underlying this invention.

EXAMPLE 1

The starting chromium dioxide was a $CrO_2$ modified with 650 ppm of Te and 1500 ppm of Fe. Its coercive force (measured in a field of 1000 Oersted) amounted to 550 Oersted; its maximum magnetization $B_m$ (also measured in a field of 1000 Oersted) equaled 3015 Gauss; the residual magnetization $B_r$ amounted to 1920 Gauss.

300 grams of this chromium dioxide were placed into a container provided with a tight lid, whose volume amounted to 4000 cc. Into the same container were also put 2700 g of glass spheres having a diameter of 2.5 mm and 1200 g of deionized water.

This container was then fixed on a Red Devil apparatus which exerted a vigorous shaking that will cause the milling of the chromium dioxide. At the end of the milling step the average or mean size of the agglomerates of particles proved to be lower than 10 microns. The glass spheres were then separated from the $CrO_2$ slurry by retaining them on a fine net and they were then washed with 4740 g of de-ionized water. The washing water was added to the slurry whereby the concentration in $CrO_2$ of the latter dropped to 50 g/lt.

6000 cc of this slurry were then placed into a 10 liter beaker, vigorously stirred with a blade stirrer, and then heated to 65° C.

To the heated slurry were then added 55.78 g of $FeSO_4 \cdot 7H_2O$ and 25.05 grams of $CuSO_4 \cdot 5H_2O$ dissolved in 1000 ml of deionized water.

The dosing of the metal ions was such as to obtain, after calcining, 8 g of coating per 100 g of $CrO_2$.

After about 30 minutes there was added some NaOH solution having a concentration of 70 g/lt so as to attain in a further 30 minutes a pH value of 9.5. The temperature was then maintained at 65° C. for about 2 hours while maintaining the stirring and at the same time bubbling air drawn from a bottle in the quantity of 30 normal liters per hour.

The $CrO_2$ slurry was thereupon filtered under vacuum on a Büchner funnel and then washed up to the elimination of the $SO_4^{--}$ ions from the washing waters.

In a second stage the cake was dried in an oven under a vacuum of 20 mmHg at 90° C. for 12 hours. The dry $CrO_2$ was thereupon dis-aggregated by means of dry milling in an Alpine impact stud mill with counter-rotating stud discs.

The powdery product was finally calcined in a third stage, in a rotary furnace, at a temperature of 350° C., for 10 hours.

The stabilized product thus obtained displayed a coercive force of 545 Öersted a maximum magnetization of 2600 Gauss and a residual magnetization of 1600 Gauss.

Upon diffractometric X-ray analysis, the coating appeared to consist of $CuFe_2O_4$, alpha-$Fe_2O_3$ and CuO. The proportion of $CuFe_2O_4$ amounted to about 25% by weight of the coating.

For the evaluation of the stability of the product, there was prepared a film according to the following procedure:

To 5 g of stabilized chromium dioxide were added 15 g of a varnish formulation for $CrO_2$ consisting of:

| polymeric compounds (saturated polyurethane and vinyl acetate and vinyl chloride copolymer) | 18% by weight |
| methylethylketone | 40% by weight |
| tetrahydrofuran | 20% by weight |
| dimethylacetamide | 20% by weight |
| anionic surfactant (conventional) | 2% by weight |

To this mixture were then added 15 g of tetrahydrofuran and the whole was introduced into a 100 ml glass container together with 45 g of small glass spheres of 5 mm diameter.

This container was then placed in a Red Devil vibration disperser where it was subjected to vigorous stirring for one hour. After this time there were added a further 10 g of the formulation and 5 g of tetrahydrofuran and stirring went on for another 5 minutes.

The homogeneous varnish thus obtained was spread on a flexible support consisting of a plasticized cardboard giving to the film spreader a thickness of 8 mils (203 microns).

The spread varnish, allowed to dry for 24 hours, was then measured for $B_m$ and $B_r$ values by means of an alternating current hysteresigraph with a magnetizing field of 1000 Öe. The cardboard supported film was then exposed for 4 days at 65° C. in an environment having a relative humidity of 50%.

Then $B_m$ and $B_r$ were measured again and the percentage decrease of these values due to the exposure was evaluated. The drop in $B_m$ and $B_r$ proved equal to 12%.

With an identical film prepared according to the same procedures, starting from 5 g of the same $CrO_2$ not stabilized but subjected to the same stability test, the loss in $B_m$ and $B_r$ was equal to 23%.

EXAMPLES 2-5

The starting chromium dioxide contained 700 parts per million of Te and 1500 ppm of Fe. This chromium dioxide showed the following magnetic properties: $H_c = 590$ Öersted; $B_m = 2900$ Gauss; $B_r = 1800$ Gauss.

It was subjected to the same procedures as those indicated in Example 1, except that there were used different quantities of reactants in order to coat the product with different quantities of stabilizing agent.

The stability on a magnetic film was evaluated following the same procedures as those indicated in Example 1. The characteristics of the stabilized product and the results of the stability tests are recorded in Table 1.

For comparative purposes, there are also reported the results of stability tests carried out on a sample of the same $CrO_2$ but not stabilized.

EXAMPLES 6-9

Here the procedure was as in previous Examples 2 to 5, except that the calcining temperature was 300° C. The characteristics of the products thus obtained and the results of the stability tests on them are recorded on Table II.

Under X-ray diffractometric analysis, the coating of Example 9 was shown to be composed of $CuFe_2O_4$, alpha-$Fe_2O_3$ and CuO. The proportion of $CuFe_2O_4$ amounted to about 18% by weight of the coating.

TABLE I

| Example No. | Quantity of coating: % by weight with respect to the $CrO_2$ | Magnetic Properties of the Stabilized $CrO_2$ | | | Stability Test on the film: drop of $B_m$ in percentage |
| --- | --- | --- | --- | --- | --- |
| | | $H_c$ in Öersted | $B_m$ in Gauss | $B_r$ in Gauss | |
| 2 | 2.5 | 590 | 2750 | 1700 | 15 |
| 3 | 5 | 590 | 2650 | 1650 | 13 |
| 4 | 7.5 | 585 | 2565 | 1615 | 12.5 |
| 5 | 10 | 595 | 2450 | 1500 | 12 |
| Comparative test with the same $CrO_2$ not stabilized | | | | | 23 |

TABLE II

| Example No. | Quantity of coating: % by weight with respect to the $CrO_2$ | Magnetic Properties of the Stabilized $CrO_2$ | | | Stability Test on the film: drop of $B_m$ in percentage |
|---|---|---|---|---|---|
| | | $H_c$ in Öersted | $B_m$ in Gauss | $R_r$ in Gauss | |
| 6 | 2.5 | 595 | 2680 | 1680 | 17.5 |
| 7 | 5 | 590 | 2600 | 1620 | 17 |
| 8 | 7.5 | 595 | 2550 | 1600 | 17 |
| 9 | 10 | 595 | 2300 | 1450 | 16.5 |
| Comparative test with the same $CrO_2$ not stabilized | | | | | 23 |

EXAMPLE 10

The starting chromium dioxide was modified with 1200 ppm of Te and 1500 ppm of Fe and showed the following magnetic properties: $H_c = 620$ Öersted; $B_m = 2800$ Gauss; $B_r = 1750$ Gauss.

It was worked up as in Example 1, except that the quantities of reactants were such as to give a 6% by weight coating.

The magnetic characteristics of the stabilized product were the following: $H_c = 605$ Öersted; $B_m = 2600$ Gauss; $B_r = 1600$ Gauss.

The drop in $B_m$, in the measuring of the stability, was equal to 13% against a value of 27% for the starting product.

EXAMPLE 11

Example 10 was repeated, except that in this case there was used $Fe_2(SO_4)_3.4H_2O$ instead of $FeSO_4.7H_2O$. Air was also bubbled through as in the other examples.

In the stability test, the drop in $B_m$ proved to be 13% against a value of 27% for the non-stabilized product.

EXAMPLES 12–13

The starting $CrO_2$ was modified with 1000 ppm of Te and 1500 ppm of Fe and showed the following magnetic properties: $H_c = 600$ Öersted; $B_m = 2850$ Gauss; $B_r = 1700$ Gauss.

It was worked up as in Example 1, except that the first stage was carried out at 20° C. (Example 12) or at 80° C. (Example 13) instead of at 65° C.

In Example 12 the stabilized product showed the following magnetic properties: $H_c = 595$ Öersted; $B_m = 2620$ Gauss; $B_r = 1550$ Gauss, and the drop of $B_m$ in the tape amounted to 16% against 30% for the non-stabilized product.

In Example 13 the stabilized product showed the same magnetic properties as those of Example 12, while the drop in $B_m$ in the tape amounted to 12%.

EXAMPLES 14–17

In these examples Mn, Mg, Co and Zn compounds were used instead of Cu compounds.

The $CrO_2$ of Example 12 was employed and the procedures of Example 1 were followed, except that the quantity of coating amounted to 10%, and the starting bivalent metal salt was respectively $MnSO_4.H_2O$; $MgSO_4.7H_2O$; $CoSO_4.7H_2O$; and $ZnSO_4.7H_2O$.

The characteristics of the stabilized products and the results of the stability tests are recorded in Table III.

The coating of the product of Example 14 consists of MnO and $Fe_2O_3$ and is free of ferrite.

The coating of the product of Example 15 consists of $MgFe_2O_4$ (about 75% by weight), MgO and alpha-$Fe_2O_3$.

The coating of the product of Example 17 consists of $ZnFe_2O_4$ (about 60% by weight), ZnO and alpha-$Fe_2O_3$.

TABLE III

| Example No. | Nature of the Bivalent Metal | Quantity of coating: % by weight with respect to the $CrO_2$ | Magnetic Properties of the Stabilized $CrO_2$ | | | Test of Stability in the film: drop of $B_m$ in percentage |
|---|---|---|---|---|---|---|
| | | | $H_c$ in Öersted | $B_m$ in Gauss | $B_r$ in Gauss | |
| 14 | Mn | 10 | 600 | 2600 | 1500 | 14 |
| 15 | Mg | 10 | 605 | 2550 | 1450 | 22 |
| 16 | Co | 10 | 595 | 2580 | 1500 | 15.5 |
| 17 | Zn | 10 | 595 | 2600 | 1500 | 19.5 |
| Comparative test with the same $CrO_2$ not stabilized | | | | | | 30 |

EXAMPLE 18

Here the procedure was as in Example 16, except that the first stage was carried out at 80° C. instead of at 65° C.

The stabilized product showed the following magnetic properties: $H_c = 585$ Öersted; $B_m = 2600$ Gauss; and $B_r = 1510$ Gauss.

The drop of $B_m$ in the tape amounted to 14% as against 25% for the non-stabilized product.

The coating consisted of $CoFe_2O_4$ (about 35% by weight), CoO and alpha-$Fe_2O_3$.

What is claimed is:

1. A ferromagnetic chromium dioxide stabilized by coating the particles thereof with a stabilizing substance, characterized in that the stabilizing substance consists essentially of a mixture of ferrite $MeFe_2O_4$ with alpha-$Fe_2O_3$ and MeO, wherein Me represents Cu, Co, Zn or Mg and where the molar ratio $Fe_2O_3/MeO$ is equal to 1, said substance being present in an amount between 2 and 12% by weight based on the $CrO_2$ and having been formed in situ by precipitating onto the surface of the $CrO_2$ particles quantities of $Fe(OH)_3$ that are equivalent to a molar ratio $Fe_2O_3/MeO$ of 1 and $Me(OH)_2$, drying the chromium dioxide coated with the hydroxides and calcining it at a temperature between 250° and 350° C., the quantity of the ferrite in the substance being that which is formed at said calcination temperature.

2. A chromium dioxide according to claim 1, characterized in that Me is either Cu or Co.

3. A process for obtaining $CrO_2$ stabilized according to claim 1, characterized in that the $CrO_2$ is dispersed in water and that on it are coprecipitated quantities of Fe(OH)$_3$ and Me(OH)$_2$ that are equivalent to a molar ratio Fe$_2$O$_3$/MeO of 1 and in that the CrO$_2$, containing the coprecipitated hydroxides, is separated from the water, dried at a temperature not exceeding 100° C. and calcined at temperatures between 250° and 350° C.

4. A process according to claim 3, characterized in that Fe(OH)$_3$ and Me(OH)$_2$ are co-precipitated by reaction of water-soluble Me and ferric or ferrous iron salts with an aqueous solution of an alkaline hydroxide or of ammonia and that, in the case of a ferrous salt, first there is precipitated Fe(OH)$_2$ and this is then oxidized to Fe(OH)$_3$ by means of an oxidizing agent.

5. A process according to claim 4, characterized in that the oxidation of Fe(OH)$_2$ is carried out by bubbling air or oxygen through the reaction medium.

6. A process according to any one of claims 3 to 5, characterized in that the calcining is carried out at temperatures between 300° and 350° C.

* * * * *